(12) United States Patent
Black et al.

(10) Patent No.: US 11,497,050 B2
(45) Date of Patent: Nov. 8, 2022

(54) SMART REPEATER SYSTEMS

(71) Applicant: Pivotal Commware, Inc., Kirkland, WA (US)

(72) Inventors: Eric James Black, Bothell, WA (US); Mersad Cavcic, Kirkland, WA (US); Brian Mark Deutsch, Issaquah, WA (US); Andjela Ilic-Savoia, Pinellas Park, FL (US); Alexander Remley Katko, Seattle, WA (US); Steven Howard Ostroff, Sunrise, FL (US); Colby John Harper, Seattle, WA (US)

(73) Assignee: Pivotal Commware, Inc., Kirkland, WA (US)

( * ) Notice: Subject to any disclaimer, the term of this patent is extended or adjusted under 35 U.S.C. 154(b) by 0 days.

(21) Appl. No.: 17/585,418

(22) Filed: Jan. 26, 2022

(65) Prior Publication Data
US 2022/0240305 A1   Jul. 28, 2022

Related U.S. Application Data

(60) Provisional application No. 63/174,511, filed on Apr. 13, 2021, provisional application No. 63/141,914, filed on Jan. 26, 2021.

(51) Int. Cl.
*H04W 72/14* (2009.01)
*H04B 7/06* (2006.01)
*H04B 7/155* (2006.01)

(52) U.S. Cl.
CPC .......... *H04W 72/14* (2013.01); *H04B 7/0617* (2013.01); *H04B 7/155* (2013.01)

(58) Field of Classification Search
None
See application file for complete search history.

(56) References Cited

U.S. PATENT DOCUMENTS

| 2,131,108 A | 9/1938 | Lindenblad |
| 4,464,663 A | 8/1984 | Lalezari et al. |
| (Continued) | | |

FOREIGN PATENT DOCUMENTS

| CN | 102948089 A | 2/2013 |
| CN | 106664124 A | 5/2017 |
| (Continued) | | |

OTHER PUBLICATIONS

Office Communication for U.S. Appl. No. 15/925,612 dated Jun. 15, 2018, pp. 1-9.

(Continued)

*Primary Examiner* — Hong S Cho
(74) *Attorney, Agent, or Firm* — John W. Branch; Branch Partners PLLC

(57) ABSTRACT

A system for 5G radio access networks, that enables smart RF signal repeater devices to perform many of the functions of a 5G base station to extend millimeter wave coverage for 5G communication networks while reducing costs, increasing versatility and optimizing coverage for user devices (UEs). The devices may include outdoor network repeaters and indoor subscriber repeaters, and other mmWave network transmitter devices in a mmWave network. Different types of 5G wireless communication networks may be employed including Open Radio Access Network (O-RAN), and Next Gen Radio Access Network (NG-RAN).

26 Claims, 5 Drawing Sheets

(56) References Cited

U.S. PATENT DOCUMENTS

| | | | |
|---|---|---|---|
| 6,133,880 | A | 10/2000 | Grangeat et al. |
| 6,150,987 | A | 11/2000 | Sole et al. |
| 6,529,745 | B1 | 3/2003 | Fukagawa et al. |
| 6,680,923 | B1 | 1/2004 | Leon |
| 7,084,815 | B2 | 8/2006 | Phillips et al. |
| 7,205,949 | B2 | 4/2007 | Turner |
| 9,356,356 | B2 | 5/2016 | Chang et al. |
| 9,385,435 | B2 | 7/2016 | Bily et al. |
| 9,450,310 | B2 | 9/2016 | Bily et al. |
| 9,551,785 | B1 | 1/2017 | Geer |
| 9,635,456 | B2 | 4/2017 | Fenichel |
| 9,711,852 | B2 | 7/2017 | Chen et al. |
| 9,806,414 | B2 | 10/2017 | Chen et al. |
| 9,806,415 | B2 | 10/2017 | Chen et al. |
| 9,806,416 | B2 | 10/2017 | Chen et al. |
| 9,812,779 | B2 | 11/2017 | Chen et al. |
| 9,813,141 | B1 | 11/2017 | Marupaduga et al. |
| 9,955,301 | B2 | 4/2018 | Markhovsky et al. |
| 10,033,109 | B1 | 7/2018 | Gummalla et al. |
| 10,225,760 | B1 | 3/2019 | Black |
| 10,277,338 | B2 * | 4/2019 | Reial ............ H04B 17/16 |
| 10,313,894 | B1 | 6/2019 | Desclos et al. |
| 10,324,158 | B2 | 6/2019 | Wang et al. |
| 10,431,899 | B2 | 10/2019 | Bily et al. |
| 10,468,767 | B1 | 11/2019 | McCandless et al. |
| 10,505,620 | B2 | 12/2019 | Ito et al. |
| 10,734,736 | B1 | 8/2020 | McCandless et al. |
| 11,069,975 | B1 | 7/2021 | Mason et al. |
| 11,190,266 | B1 | 11/2021 | Black et al. |
| 11,252,731 | B1 * | 2/2022 | Levitsky ............ H04W 72/048 |
| 2002/0196185 | A1 | 12/2002 | Bloy |
| 2003/0025638 | A1 | 2/2003 | Apostolos |
| 2004/0003250 | A1 | 1/2004 | Kindberg et al. |
| 2004/0038714 | A1 | 2/2004 | Rhodes et al. |
| 2004/0229651 | A1 | 11/2004 | Hulkkonen et al. |
| 2005/0237265 | A1 | 10/2005 | Durham et al. |
| 2005/0282536 | A1 | 12/2005 | McClure et al. |
| 2006/0025072 | A1 | 2/2006 | Pan |
| 2007/0024514 | A1 | 2/2007 | Phillips et al. |
| 2007/0147338 | A1 | 6/2007 | Chandra et al. |
| 2007/0184828 | A1 | 8/2007 | Majidi-Ahy |
| 2007/0202931 | A1 | 8/2007 | Lee et al. |
| 2008/0039012 | A1 | 2/2008 | McKay et al. |
| 2008/0049649 | A1 | 2/2008 | Kozisek et al. |
| 2008/0181328 | A1 | 7/2008 | Harel et al. |
| 2009/0176487 | A1 | 7/2009 | DeMarco |
| 2009/0207091 | A1 | 8/2009 | Anagnostou et al. |
| 2009/0296938 | A1 | 12/2009 | Devanand et al. |
| 2010/0197222 | A1 | 8/2010 | Scheucher |
| 2010/0248659 | A1 | 9/2010 | Kawabata |
| 2010/0302112 | A1 | 12/2010 | Lindenmeier et al. |
| 2011/0070824 | A1 | 3/2011 | Braithwaite |
| 2011/0199279 | A1 | 8/2011 | Shen et al. |
| 2011/0292843 | A1 | 12/2011 | Gan et al. |
| 2012/0064841 | A1 | 3/2012 | Husted et al. |
| 2012/0094630 | A1 | 4/2012 | Wisnewski et al. |
| 2012/0194399 | A1 | 8/2012 | Bily et al. |
| 2013/0059620 | A1 * | 3/2013 | Cho ............ H04W 16/28 455/515 |
| 2013/0069834 | A1 | 3/2013 | Duerksen |
| 2013/0231066 | A1 | 9/2013 | Zander et al. |
| 2013/0303145 | A1 | 11/2013 | Harrang et al. |
| 2013/0324076 | A1 | 12/2013 | Harrang |
| 2014/0094217 | A1 | 4/2014 | Stafford |
| 2014/0171811 | A1 | 6/2014 | Lin et al. |
| 2014/0198684 | A1 | 7/2014 | Gravely et al. |
| 2014/0266946 | A1 | 9/2014 | Bily et al. |
| 2014/0269417 | A1 | 9/2014 | Yu et al. |
| 2014/0293904 | A1 | 10/2014 | Dai et al. |
| 2014/0308962 | A1 | 10/2014 | Zhang et al. |
| 2014/0349696 | A1 | 11/2014 | Hyde et al. |
| 2015/0109178 | A1 | 4/2015 | Hyde et al. |
| 2015/0109181 | A1 | 4/2015 | Hyde et al. |
| 2015/0116153 | A1 | 4/2015 | Chen et al. |
| 2015/0131618 | A1 | 5/2015 | Chen |
| 2015/0162658 | A1 | 6/2015 | Bowers et al. |
| 2015/0222021 | A1 | 8/2015 | Stevenson et al. |
| 2015/0229028 | A1 | 8/2015 | Bily et al. |
| 2015/0236777 | A1 | 8/2015 | Akhtar et al. |
| 2015/0276926 | A1 | 10/2015 | Bowers et al. |
| 2015/0276928 | A1 | 10/2015 | Bowers et al. |
| 2015/0288063 | A1 | 10/2015 | Johnson et al. |
| 2015/0318618 | A1 | 11/2015 | Chen et al. |
| 2015/0372389 | A1 | 12/2015 | Chen et al. |
| 2016/0037508 | A1 | 2/2016 | Sun |
| 2016/0079672 | A1 | 3/2016 | Cerreno |
| 2016/0087334 | A1 | 3/2016 | Sayama et al. |
| 2016/0149308 | A1 | 5/2016 | Chen et al. |
| 2016/0149309 | A1 | 5/2016 | Chen et al. |
| 2016/0149310 | A1 | 5/2016 | Chen et al. |
| 2016/0164175 | A1 | 6/2016 | Chen et al. |
| 2016/0174241 | A1 | 6/2016 | Ansari et al. |
| 2016/0198334 | A1 | 7/2016 | Bakshi et al. |
| 2016/0219539 | A1 | 7/2016 | Kim et al. |
| 2016/0241367 | A1 | 8/2016 | Irmer et al. |
| 2016/0269964 | A1 | 9/2016 | Murray |
| 2016/0345221 | A1 | 11/2016 | Axmon et al. |
| 2016/0365754 | A1 | 12/2016 | Zeine et al. |
| 2016/0373181 | A1 * | 12/2016 | Black ............ H04W 16/28 |
| 2017/0118750 | A1 | 4/2017 | Kikuma et al. |
| 2017/0127295 | A1 | 5/2017 | Black et al. |
| 2017/0127296 | A1 | 5/2017 | Gustafsson et al. |
| 2017/0127332 | A1 | 5/2017 | Axmon et al. |
| 2017/0155192 | A1 | 6/2017 | Black et al. |
| 2017/0155193 | A1 | 6/2017 | Black et al. |
| 2017/0187123 | A1 | 6/2017 | Black et al. |
| 2017/0187426 | A1 | 6/2017 | Su et al. |
| 2017/0194704 | A1 | 7/2017 | Chawgo et al. |
| 2017/0195054 | A1 | 7/2017 | Ashrafi |
| 2017/0238141 | A1 | 8/2017 | Lindoff et al. |
| 2017/0310017 | A1 | 10/2017 | Howard |
| 2017/0339575 | A1 | 11/2017 | Kim et al. |
| 2017/0367053 | A1 | 12/2017 | Noh et al. |
| 2017/0373403 | A1 | 12/2017 | Watson |
| 2018/0013193 | A1 | 1/2018 | Olsen et al. |
| 2018/0027555 | A1 | 1/2018 | Kim et al. |
| 2018/0066991 | A1 | 3/2018 | Mueller et al. |
| 2018/0097286 | A1 | 4/2018 | Black et al. |
| 2018/0123692 | A1 | 5/2018 | Leiba |
| 2018/0177461 | A1 | 6/2018 | Bell et al. |
| 2018/0219283 | A1 | 8/2018 | Wilkins et al. |
| 2018/0227035 | A1 | 8/2018 | Cheng et al. |
| 2018/0227445 | A1 | 8/2018 | Minegishi |
| 2018/0233821 | A1 | 8/2018 | Pham et al. |
| 2018/0270729 | A1 | 9/2018 | Ramachandra et al. |
| 2018/0301821 | A1 | 10/2018 | Black et al. |
| 2018/0337445 | A1 | 11/2018 | Sullivan et al. |
| 2018/0368389 | A1 | 12/2018 | Adams |
| 2019/0020107 | A1 | 1/2019 | Polehn et al. |
| 2019/0052428 | A1 | 2/2019 | Chu et al. |
| 2019/0053013 | A1 | 2/2019 | Markhovsky et al. |
| 2019/0067813 | A1 | 2/2019 | Igura |
| 2019/0219982 | A1 | 7/2019 | Klassen et al. |
| 2019/0221931 | A1 | 7/2019 | Black et al. |
| 2019/0289482 | A1 | 9/2019 | Black |
| 2019/0336107 | A1 | 11/2019 | Hope Simpson et al. |
| 2020/0008163 | A1 | 1/2020 | Biack et al. |
| 2020/0137698 | A1 | 4/2020 | Black et al. |
| 2020/0186227 | A1 | 6/2020 | Reider et al. |
| 2020/0205012 | A1 | 6/2020 | Bengtsson et al. |
| 2020/0259552 | A1 | 8/2020 | Ashworth |
| 2020/0313741 | A1 | 10/2020 | Zhu et al. |
| 2021/0067237 | A1 * | 3/2021 | Sampath ............ H04W 56/005 |
| 2021/0234591 | A1 | 7/2021 | Eleftheriadis et al. |
| 2021/0328664 | A1 | 10/2021 | Schwab et al. |
| 2021/0367684 | A1 | 11/2021 | Bendinelli et al. |
| 2021/0368355 | A1 | 11/2021 | Liu et al. |
| 2022/0014933 | A1 | 1/2022 | Moon et al. |
| 2022/0053433 | A1 * | 2/2022 | Abedini ............ H04L 5/0023 |

FOREIGN PATENT DOCUMENTS

| | | | |
|---|---|---|---|
| CN | 106797074 | A | 5/2017 |
| CN | 110034416 | A | 7/2019 |

(56) References Cited

FOREIGN PATENT DOCUMENTS

| | | |
|---|---|---|
| EP | 3273629 A1 | 1/2018 |
| JP | 61-1102 A | 1/1986 |
| JP | 936656 A | 2/1997 |
| JP | 2000-111630 A | 4/2000 |
| JP | 3307146 B2 | 7/2002 |
| JP | 3600459 B2 | 12/2004 |
| JP | 2007081648 A | 3/2007 |
| JP | 2007306273 A | 11/2007 |
| JP | 2008-153798 A | 7/2008 |
| JP | 2012-175189 A | 9/2012 |
| JP | 2014207626 A | 10/2014 |
| JP | 2017-220825 A | 12/2017 |
| JP | 2018-14713 A | 1/2018 |
| JP | 2018-173921 A | 11/2018 |
| JP | 2020-145614 A | 9/2020 |
| KR | 10 2016 0113100 A | 9/2016 |
| WO | 2010104435 A1 | 9/2010 |
| WO | 2012050614 A1 | 4/2012 |
| WO | 2012096611 A2 | 7/2012 |
| WO | 2012161612 A1 | 11/2012 |
| WO | 2013023171 A1 | 2/2013 |
| WO | 2015196044 A1 | 12/2015 |
| WO | 2016044069 A1 | 3/2016 |
| WO | 2017014842 A1 | 1/2017 |
| WO | 2017193056 A1 | 11/2017 |
| WO | 2018144940 A1 | 8/2018 |
| WO | 2018179870 A1 | 10/2018 |
| WO | 2020095597 A1 | 5/2020 |

OTHER PUBLICATIONS

U.S. Appl. No. 14/510,947, filed Oct. 9, 2014, pp. 1-76.
Office Communication for U.S. Appl. No. 16/049,630 dated Oct. 4, 2018, pp. 1-13.
Office Communication for U.S. Appl. No. 15/870,758 dated Oct. 1, 2018, pp. 1-12.
Office Communication for U.S. Appl. No. 16/136,119 dated Nov. 23, 2018, pp. 1-12.
Office Communication for U.S. Appl. No. 16/136,119 dated Mar. 15, 2019, pp. 1-8.
Office Communication for U.S. Appl. No. 16/292,022 dated Jun. 7, 2019, pp. 1-13.
Office Communication for U.S. Appl. No. 16/049,630 dated Apr. 12, 2019, pp. 1-13.
Office Communication for U.S. Appl. No. 16/268,469 dated May 16, 2019, pp. 1-16.
Office Communication for U.S. Appl. No. 16/280,939 dated May 13, 2019, pp. 1-22.
Office Communication for U.S. Appl. No. 16/440,815 dated Jul. 17, 2019, pp. 1-16.
Office Communication for U.S. Appl. No. 16/358,112 dated May 15, 2019, pp. 1-17.
International Search Report and Written Opinion for International Application No. PCT/US2019/022942 dated Jul. 4, 2019, pp. 1-12.
Yurduseven, Okan et al., "Dual-Polarization Printed Holographic Multibeam Metasurface Antenna" Aug. 7, 2017, IEEE Antennas and Wireless Propagation Letters. pp. 10.1109/LAWP.2017, pp. 1-4.
International Search Report and Written Opinion for International Application No. PCT/US2019/022987 dated Jul. 2, 2019, pp. 1-13.
Office Communication for U.S. Appl. No. 16/049,630 dated Jun. 24, 2019, pp. 1-5.
Office Communication for U.S. Appl. No. 16/280,939 dated Jul. 18, 2019, pp. 1-7.
Office Communication for U.S. Appl. No. 16/049,630 dated Aug. 7, 2019, pp. 1-13.
Office Communication for U.S. Appl. No. 16/292,022 dated Sep. 23, 2019, pp. 1-9.
Office Communication for U.S. Appl. No. 16/440,815 dated Oct. 7, 2019, pp. 1-5.
Office Communication for U.S. Appl. No. 16/268,469 dated Sep. 10, 2019, pp. 1-11.
International Search Report and Written Opinion for International Application No. PCT/US2019/041053 dated Aug. 27, 2019, pp. 1-8.
Office Communication for U.S. Appl. No. 16/568,096 dated Oct. 24, 2019, pp. 1-10.
International Search Report and Written Opinion for International Application No. PCT/US2019/047093 dated Oct. 21, 2019, pp. 1-7.
Office Communication for U.S. Appl. No. 16/049,630 dated Dec. 9, 2019, pp. 1-13.
Office Communication for U.S. Appl. No. 16/440,815 dated Jan. 8, 2020, pp. 1-8.
Office Communication for U.S. Appl. No. 16/730,932 dated Mar. 6, 2020, pp. 1-13.
Office Communication for U.S. Appl. No. 16/049,630 dated Mar. 31, 2020, pp. 1-15.
Office Communication for U.S. Appl. No. 16/734,195 dated Mar. 20, 2020, pp. 1-8.
Office Communication for U.S. Appl. No. 16/846,670 dated Jun. 11, 2020, pp. 1-12.
Office Communication for U.S. Appl. No. 16/673,852 dated Jun. 24, 2020, pp. 1-11.
International Search Report and Written Opinion for Application No. PCT/US2020/016641 dated Apr. 14, 2020, pp. 1-7.
Gao, S.S. et al., "Holographic Artificial Impedance Surface Antenna Based on Circular Patch", 2018 International Conference on Microwave and Millimeter Wave Technology (ICMMT), 2018, pp. 1-3.
Nishiyama, Eisuke et al., "Polarization Controllable Microstrip Antenna using Beam Lead PIN Diodes", 2006 Asia-Pacific Microwave Conference, 2006, pp. 1-4.
International Search Report and Written Opinion for Application No. PCT/US2020/013713 dated Apr. 21, 2020, pp. 1-8.
Office Communication for U.S. Appl. No. 16/049,630 dated Aug. 19, 2020, pp. 1-18.
Office Communication for U.S. Appl. No. 16/730,932 dated Aug. 25, 2020, pp. 1-5.
Office Communication for U.S. Appl. No. 16/983,927 dated Aug. 31, 2020, pp. 1-7.
Office Communication for U.S. Appl. No. 16/983,978 dated Sep. 16, 2020, pp. 1-7.
Office Communication for U.S. Appl. No. 16/049,630 dated Oct. 15, 2020, pp. 1-16.
Office Communication for U.S. Appl. No. 16/983,978 dated Oct. 27, 2020, pp. 1-13.
International Search Report and Written Opinion for Application No. PCT/US2020/048806 dated Nov. 17, 2020, pp. 1-9.
Office Communication for U.S. Appl. No. 16/673,852 dated Nov. 25, 2020, pp. 1-8.
Office Communication for U.S. Appl. No. 16/846,670 dated Nov. 25, 2020, pp. 1-13.
Office Communication for U.S. Appl. No. 16/983,927 dated Jan. 6, 2021, pp. 1-8.
Office Communication for U.S. Appl. No. 16/846,670 dated Feb. 8, 2021, pp. 1-4.
Office Communication for U.S. Appl. No. 16/983,978 dated Feb. 10, 2021, pp. 1-11.
Office Communication for U.S. Patent Application No. 16/846,670 dated Apr. 2, 2021, pp. 1-9.
Office Communication for U.S. Appl. No. 16/730,690 dated Apr. 8, 2021, pp. 1-11.
Office Communication for U.S. Appl. No. 17/177,131 dated Apr. 9, 2021, pp. 1-17.
Vu, Trung Kien et al., "Joint Load Balancing and Interference Mitigation in 5G Heterogeneous Networks," IEEE Transactions on Wireless Communications, 2017, vol. 16, No. 9, pp. 6032-6046.
Office Communication for U.S. Appl. No. 17/177,145 dated Apr. 19, 2021, pp. 1-11.
Office Communication for U.S. Appl. No. 17/112,940 dated Jul. 21, 2021, pp. 1-22.
International Search Report and Written Opinion for International Patent Application No. PCT/US2021/026400 dated Jul. 20, 2021, pp. 1-7.
Office Communication for U.S. Appl. No. 17/177,145 dated Aug. 3, 2021, pp. 1-16.

(56) References Cited

OTHER PUBLICATIONS

Office Communication for U.S. Appl. No. 17/177,131 dated Aug. 6, 2021, pp. 1-16.
Office Communication for U.S. Appl. No. 17/112,940 dated Aug. 9, 2021, pp. 1-20.
International Search Report and Written Opinion for International Patent Application No. PCT/US2021/034479 dated Aug. 10, 2021, pp. 1-7.
Office Communication for U.S. Appl. No. 17/332,136 dated Sep. 2, 2021, pp. 1-9.
Office Communication for Chinese Patent Application No. 201980019925.1 dated Sep. 27, 2021, pp. 1-25.
Office Communication for U.S. Appl. No. 17/177,145 dated Oct. 14, 202, pp. 1-5.
International Search Report and Written Opinion for International Patent Application No. PCT/US2021/043308 dated Nov. 2, 2021, pp. 1-8.
Office Communication for U.S. Appl. No. 17/177,131 dated Nov. 12, 2021, pp. 1-5.
Extended European Search Report for European Patent Application No. 19772471.9 dated Nov. 8, 2021, pp. 1-8.
Office Communication for U.S. Appl. No. 17/177,145 dated Nov. 16, 2021, pp. 1-16.
Office Communication for U.S. Appl. No. 17/177,131 dated Dec. 17, 2021, pp. 1-14.
Black, Eric J., "Holographic Beam Forming and MIMO," Pivotal Commware, 2017, pp. 1-8.
Björn, Ekman, "Machine Learning for Beam Based Mobility Optimization in NR," Master of Science Thesis in Communication Systems, Department of Electrical Engineering, Linköping University, 2017, pp. 1-85.
Office Communication for U.S. Appl. No. 17/112,940 dated Dec. 22, 2021, pp. 1-15.
International Search Report and Written Opinion for International Patent Application No. PCT/US2021/049502 dated Dec. 14, 2021, pp. 1-8.
Office Communication for U.S. Appl. No. 17/469,694 dated Jan. 20, 2022, pp. 1-9.
Office Communication for U.S. Appl. No. 17/537,233 dated Feb. 4, 2022, pp. 1-9.
Office Communication for U.S. Appl. No. 17/537,233 dated Apr. 20, 2022, pp. 1-9.
Office Communication for U.S. Appl. No. 17/203,255 dated Apr. 26, 2022, pp. 1-17.
Office Communication for U.S. Appl. No. 17/177,131 dated Apr. 27, 2022, pp. 1-14.
International Search Report and Written Opinion for International Patent Application No. PCT/US2022/012613 dated May 10, 2022, pp. 1-8.
International Search Report and Written Opinion for International Patent Application No. PCT/US2022/013942 dated May 10, 2022, pp. 1-8.
Qualcomm Incorporated, "Common understanding of repeaters," 3GPP TSG RAN WG4 #98_e R4-2102829, 2021, https://www.3gpp.org/ftp/tsg_ran/WG4_Radio/TSGR4_98_e/Docs/R4-2102829.zip, Accessed: May 25, 2022, pp. 1-2.
MediaTek Inc., "General views on NR repeater," 3GPP TSG RAN WG4 #98_e R4-2101156, 2021, https://www.3gpp.org/ftp/tsg_ran/WG4_Radio/TSGR4_98_e/Docs/R4-2101156.zip, Accessed: May 25, 2022, pp. 1-4.
Office Communication for U.S. Appl. No. 17/177,145 dated Jun. 3, 2022, pp. 1-5.
Office Communication for U.S. Appl. No. 17/112,940 dated Mar. 17, 2022, pp. 1-16.
Office Communication for U.S. Appl. No. 17/576,832 dated Mar. 18, 2022, pp. 1-15.
Office Communication for U.S. Appl. No. 17/177,145 dated Mar. 24, 2022, pp. 1-18.
Office Communication for U.S. Appl. No. 17/306,361 dated Mar. 28, 2022, pp. 1-7.
Extended European Search Report for European Patent Application No. 19844867.2 dated Mar. 30, 2022, pp. 1-16.
Office Communication for U.S. Appl. No. 17/576,832 dated Apr. 1, 2022, pp. 1-14.
Office Communication for U.S. Appl. No. 17/576,832 dated Jul. 13, 2022, pp. 1-15.

* cited by examiner

SMART REPEATER SYSTEMS

CROSS-REFERENCE TO RELATED APPLICATION

This application is a Utility patent application based on previously filed U.S. Provisional Patent Application No. 63/141,914 filed on Jan. 26, 2021, and U.S. Provisional Patent Application No. 63/174,511 filed on Apr. 13, 2021. The benefits of the filing dates of these provisional applications are hereby claimed under 35 U.S.C. § 119(e) and the contents of these provisional applications are herein incorporated by reference in their entirety.

TECHNICAL FIELD

The invention relates generally to employing directional antennas placed on structures, such as poles, or buildings, that provide a wireless network for communicating RF signals between user devices and remotely located resources. Further, in some embodiments, the directional antennas may be installed at the premises of a customer and coupled to base stations and RF signal repeater devices to manage operation of a millimeter wave communications network.

BACKGROUND

Mobile devices have become the primary mode of wireless communication for most people throughout the world. In the first few generations of wireless communication networks, mobile devices were generally used for voice communication, text messages, and somewhat limited internet access. Newer generations of wireless communication networks have increased bandwidth and lowered latency enough to provide substantially more services to mobile device users, such as purchasing products, paying invoices, streaming movies, playing video games, online learning, dating, and more. Also, for each new generation of wireless communication network, the frequency and strength of the wireless signals are generally increased to provide even more bandwidth with less latency.

Unfortunately, the higher a frequency of a wireless signal, the greater the attenuation of wireless signals passing through physical barriers and over shorter distances than lower frequency wireless signals. Moreover, since the recent rollout of $5^{th}$ generation (5G) wireless communication networks that can use wireless signals with millimeter waveforms at gigahertz frequencies, smart RF signal repeater devices for 5G wireless networks are needed to distribute important processes that optimize access for mobile devices due to these physical barriers.

DESCRIPTION OF VARIOUS EMBODIMENTS OF THE INVENTION

Figure 1:
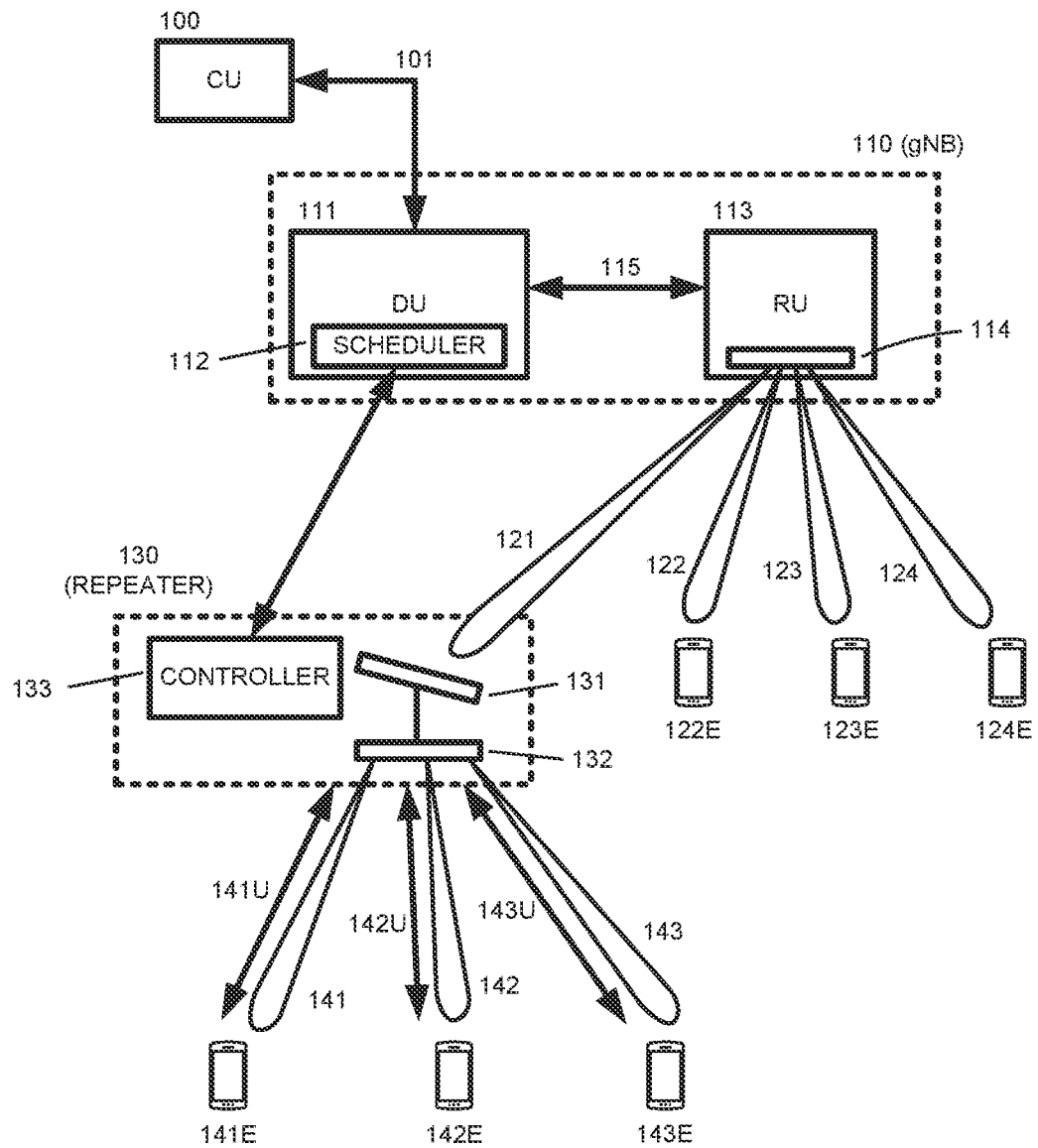
FIG. 1 depicts a wireless communication system.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Similarly, the phrase "in another embodiment" as used herein does not necessarily refer to a different embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes the embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments of the invention are directed to a method, apparatus, or system that provides a suite of devices and software applications executing on computing devices, e.g., a distributed cloud computing platform, a desktop computer, a notebook computer, and/or a mobile device. One or more of the various embodiments enables smart RF signal repeater devices to perform many of the functions of 5G base stations, e.g., a next generation NodeB (gNB), to extend millimeter wave (mmWave) coverage for 5G communication networks while reducing costs, increasing versatility, and optimizing coverage for UEs. In one or more of the various embodiments, the devices may include outdoor network repeaters, e.g., the Pivot 5G™, and indoor subscriber repeaters, e.g., the Echo 5G™, and other mmWave network transmitter devices in a mmWave network. In one or more embodiments, the novel invention may be employed with different types of 5G wireless communication networks, e.g., Open Radio Access Network (O-RAN), Next Gen Radio Access Network (NG-RAN), or the like. Various embodiments enable smart RF signal repeater devices to perform many of the functions of 5G base stations to extend millimeter wave coverage for 5G communication networks, such as an Open Radio Access Network (O-RAN) network, while reducing costs, increasing versatility and optimizing coverage.

Illustrative Wireless Communication Systems

With reference now to FIG. 1, embodiments are illustrated with a block diagram of a wireless communication system. A wireless communication system, such as a 5G communication network operating under Open Radio Access Network (O-RAN) or Next Gen Radio Access (NG-RAN) standards, can include, for example, a Central Unit or CU 100. The CU 100 interfaces via interface 101 with one or more Distributed Units or DUs 111, which are typically located on site at a wireless base station such as a gNodeB base station 110. The CU can be co-located with the DU or it can be remote, e.g., with a cloud deployment of the CU.

The DU 111 can include a scheduler 112 which determines schedule information for communication with various user equipment (UE) devices within a service area of the gNodeB. The schedule information can include, for example, information about time intervals in which selected beams are to be directed towards selected regions within the service area of the gNodeB, information about orthogonal frequency division multiplexing (OFDM) for communication with the UE devices within the service area of the gNodeB, and/or information about time intervals for uplink or downlink communication with the UE devices within the service area of the gNodeB.

The gNodeB 110 can include a radio unit or RU 113 which interfaces with the DU 111 via interface 115. The RU can convert downlink digital signals received from the DU into downlink radio signals (e.g., downlink mmWave signals) to be transmitted to UE devices within the service area of the gNodeB. The RU can also receive uplink radio signals (e.g., uplink mmWave signals) from UE devices within the service area of the gNodeB, convert these into uplink digital signals, and communicate the uplink digital signals to the DU.

While FIG. 1 depicts the gNB has having a DU 111 that is distinct from the RU 113, in some scenarios, the functions of the DU and RU can be merged as a single unit, e.g., without a well-defined interface 115 separating these functional units. For these approaches, the descriptions herein of various functions of the DU and/or the RU can be understood to describe functions of the combined unit operating as unitary gNodeB 110.

In some approaches the RU includes one or more adjustable uplink and/or downlink RF antennas 114 that are adjustable to cast a set of spatially diverse beams covering a service area of the gNodeB (depicted schematically as beams 121-124). Accordingly, the scheduler can share schedule information with the RU, e.g., information about time intervals in which selected beams are to be directed towards selected regions within the service area of the gNodeB. Thus, for example, beams 122, 123, and 124 may address user equipment 122E, 123E, and 124E, respectively.

In some scenarios the set of diverse beams 121-124 from the RU may not cover the entirety of a desired service area. For example, especially at mmWave frequencies, signals may attenuate more rapidly with spatial distance from the gNodeB, or signals may be blocked by line-of-sight obstructions such as foliage, landscape, or man-made structures such as walls or buildings. Accordingly, embodiments can include one or more repeaters 130 to expand the service area of the gNodeB.

Repeater 130 can include a donor antenna unit 131 including one or more antennas configured to communicate with the RU, e.g., by receiving downlink radio signals from the RU and by transmitting uplink radio signals to the RU. In some approaches, the donor antenna unit includes one or more static directional antennas that are oriented to point a beam towards the RU. In other approaches, the donor antenna unit includes one or more adjustable antennas that can be dynamically adjusted to point a beam towards the RU. For example, the donor antenna unit can include one or more phased array antennas. Alternatively or additionally, the donor antenna unit can include one or more holographic beamforming antennas. Repeaters that include holographic beamforming antennas are described, for example, in U.S. Pat. No. 10,425,905, which is herein incorporated by reference.

Repeater 130 can also include a service antenna unit 132 with one or more antennas configured to rebroadcast the signals received or transmitted by the donor antenna unit 131. For example, if the donor antenna unit 131 receives downlink radio signals from the RU via beam 121, the service antenna unit 132 can rebroadcast the downlink radio signals by casting a set of diverse beams 141-143 covering an extended service area of the gNodeB (that is, extended by virtue of the repeater installation). For example, beams 141, 142, and 143 may address user equipment 141E, 142E, and 143E that are out of range or out of line of sight of the RU 113. Similarly, if the service antenna unit 132 receives uplink radio signals from the user equipment 141E, 142E, and 143E via the beams 141, 142, and 143, respectively, the donor antenna unit 131 can rebroadcast the uplink radio signals to the RU via beam 121.

The service antenna unit can include one or more adjustable antennas that can be dynamically adjusted to cast a set of spatially diverse beams covering an extended service area of the gNodeB (depicted schematically as beams 141-143). For example, the service antenna unit can include one or more phased array antennas. Alternatively or additionally, the service antenna unit can include one or more holographic beamforming antennas. Repeaters that include holographic beamforming antennas are described, for example, in U.S. Pat. No. 10,425,905, which is herein incorporated by reference.

Repeater 130 can include a controller unit 133 that receives schedule information via interface 134 from the scheduler 112 and uses this schedule information to dynamically adjust the antennas of the service antenna unit. For example, if the schedule information includes information about time intervals in which selected beams (e.g., beams 141-143) are to be directed towards selected regions within the extended service area of the gNodeB, the controller unit 133 can dynamically adjust the antennas of the service antenna to cast these beams according to the prescribed time intervals.

In some approaches, the interface 134 can be provided by a wired connection between the DU 111 and the repeater 130, such as an ethernet cable, a coaxial cable, or an optical fiber connection.

In other approaches, the interface 134 can be provided by a wireless connection between the DU 111 and the repeater 130. As a first example, the interface 134 can be provided by an out-of-band wireless connection between the DU and the repeater, i.e., a wireless connection in a frequency band distinct from any frequency band(s) used by the RU 113. The out-of-band frequency band can be, for example, a private or unlicensed frequency band. As a second example, the interface 134 can be provided by a wireless connection using a 5G ultra-reliable low-latency communications (URLLC) protocol. In some scenarios (not depicted), the interface 134 for schedule information can be provided as a component of the radio signals that are transmitted by the RU 113 to the repeater 130 via the beam 121.

In some scenarios, user equipment devices, such as UEs 141E, 142E, and 143E within an extended service area of the gNodeB 110 as extended by virtue of the repeater 130, can make uplink grant requests which need to be forwarded by the repeater to the DU 111. Uplink grant requests for UEs 141E, 142E, and 143E can be communicated with repeater 130 via interfaces 141U, 142U, and 143U, respectively. In some approaches, the interfaces 141U-143U can be provided by an out-of-band wireless connection between the UEs 141-143E and the repeater 130. The out-of-band frequency band can be, for example, a private or unlicensed frequency band. In other approaches, the interfaces 141U-143U can be provided by a wireless connection using a 5G ultra-reliable low-latency communications (URLLC) protocol.

In yet other approaches, the interfaces 141U-143U can be provided via 5G sidelink communications between the repeater 130 and each UE 141E-143E. Generally speaking, 5G New Radio standards can include protocols for direct sidelink communications between user equipment devices without relaying those communications through a gNodeB. In this sidelink approach for the interfaces 141U-143U, the repeater 130 can be equipped with a module for direct sidelink communication (e.g. a 5G cellular modem or the like), and this module can thus enable direct side link communication between the repeater 130 and the user equipment 141E-143E to receive uplink grant requests.

In FIG. 1, the RU 113 is depicted as transmitting downlink radio signals (and receiving uplink radio signals) wirelessly via beam 121 between the RU 113 and the repeater 130. In other approaches, however, the RU may transmit the downlink radio signals and receive the uplink radio signals via a wired connection between the RU and the repeater. The wired connection could include, for example, a coaxial cable or an optical fiber configured for RF-over-fiber transmission. In these approaches, the donor antenna unit 131 may be replaced with a wired connection port. In yet other approaches, the repeater may not be coupled to an RU at all; for example, the repeater may have a wired connection with the DU 111. In these other approaches, the repeater can convert downlink digital signals received from the DU over the wired connection into downlink radio signals to be transmitted to UE devices within the extended service area of the repeater, and/or the repeater can receive uplink radio signals from UE devices within the extended service area of the repeater, convert these into uplink digital signals, and communicate the uplink digital signals to the DU. Essentially, in these other approaches, the repeater can function as a new radio unit for the wireless communication system.

Synchronization Signal Blocks

Figure 2A:
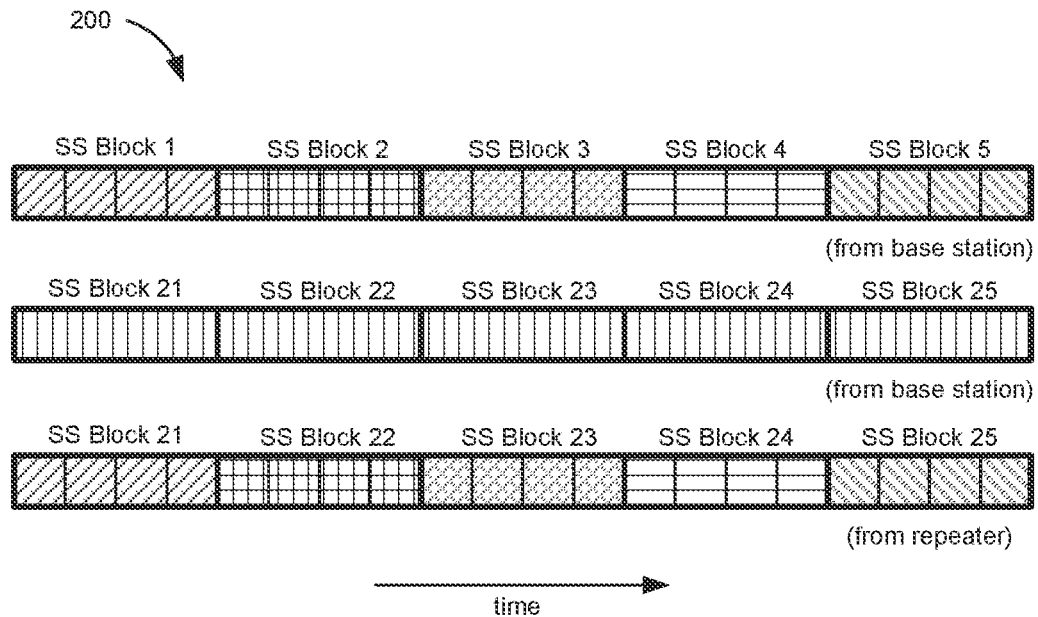
FIGS. 2A and 2B depict synchronization signal block sweep that includes a repeater.
Figure 2B:
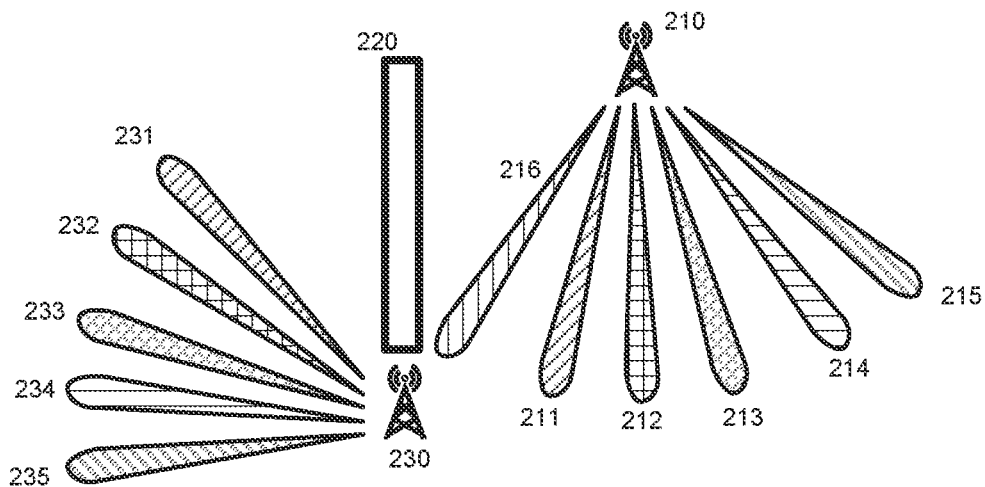

Wireless communication systems such as 5G communication systems may use synchronization signal block sweeps to synchronize communications between a wireless base station (e.g., a gNodeB base station) and user equipment located within a service area of the wireless base station. An illustrative example is depicted in FIGS. 2A and 2B. Generally speaking, a synchronization sequence 200 can include a sequence of synchronization signal blocks (e.g., SS Block 1, SS Block 2, . . . , SS Block 25), and these synchronization signal blocks can correspond to a sequence of beams patterns within a service area of the base station. In some approaches, the sequence of beam patterns can be a raster sequence of narrow beam patterns that collectively fill a service area of the wireless base station. For example, SS Blocks 1-5 of FIG. 2A can correspond to beam patterns 211-215 by a beamforming antenna at the base station 210 as shown in FIG. 2B.

In some approaches, the sequence of beam patterns can be a sequence of vertical fan beam patterns each having a narrow horizontal beam width and a wide vertical beam width, e.g., to cover a horizontal service area such as flat terrain around the wireless base station. In other approaches, the sequence of beam patterns can be a sequence of horizontal fan beam patterns each having a wide horizontal beam width and a narrow vertical beam width, e.g., to cover a vertical service area such as stories of a high-rise building. In yet other approaches, the sequence of beam patterns can be a pseudorandom or compressive imaging sequence of beam patterns that collectively fill the service area.

As discussed above in the context of FIG. 1, in some scenarios, a repeater can be installed to extend a service area of the base station. For example, especially at mmWave frequencies, signals may attenuate more rapidly with spatial distance from the base station (such as a gNodeB), or signals may be blocked by line-of-sight obstructions such as foliage, landscape, or man-made structures such as walls or buildings. The limitation on the service area of the base station is schematically illustrated by the obstruction 220 in FIG. 2B, with repeater 230 installed to extend the service area of the base station to evade the obstruction.

To synchronize communications between the base station 210 and user equipment within the extended service area of the wireless base station, the repeater 230 can repeat synchronization signals that are received from the base station 210. For example, the wireless base station can dedicate multiple beams (e.g., corresponding to SS Blocks 21-25 in FIG. 2A) for repeating by the repeater 230, and synchronization signals for these SS Blocks 21-25 can be transmitted by the base station 210 to the repeater 230 via a single beam 216 that addresses the repeater. Then, the repeater can retransmit the synchronization signals for SS Blocks 21-25 using a sequence of beam patterns 231-235 that collectively fill the extended service area of the wireless base station, e.g., the area that is outside of the line of sight of the base station.

As with the sequence of beam patterns for the base station, the sequence of repeated beam patterns can be sequence of vertical fan beam patterns, a sequence of horizontal fan beam patterns, a pseudorandom or compressive imaging sequence of beam patterns, or any other sequence that collectively fills the extended service area that is serviced by the repeater.

In some approaches, the repeater can receive the synchronization signals from the base station and retransmit the signals into the extended service area without decoding the signals. In other approaches, the repeater can receive the synchronization signals, decode or demodulate the signals, and then encode or remodulate the synchronization signals for rebroadcast into the extended service area.

In various approaches, the repeater can receive schedule information from the base station about the schedule of synchronization signals. Analogous to the discussion above in the context of FIG. 1, this schedule information can be received via a wired interface (e.g., an ethernet cable, coaxial cable, optical fiber, or the like) or via a wireless interface (e.g., an out-of-band signal in a private or unlicensed frequency band, a URLLC communication, or the like).

Process Flows

Figure 3:
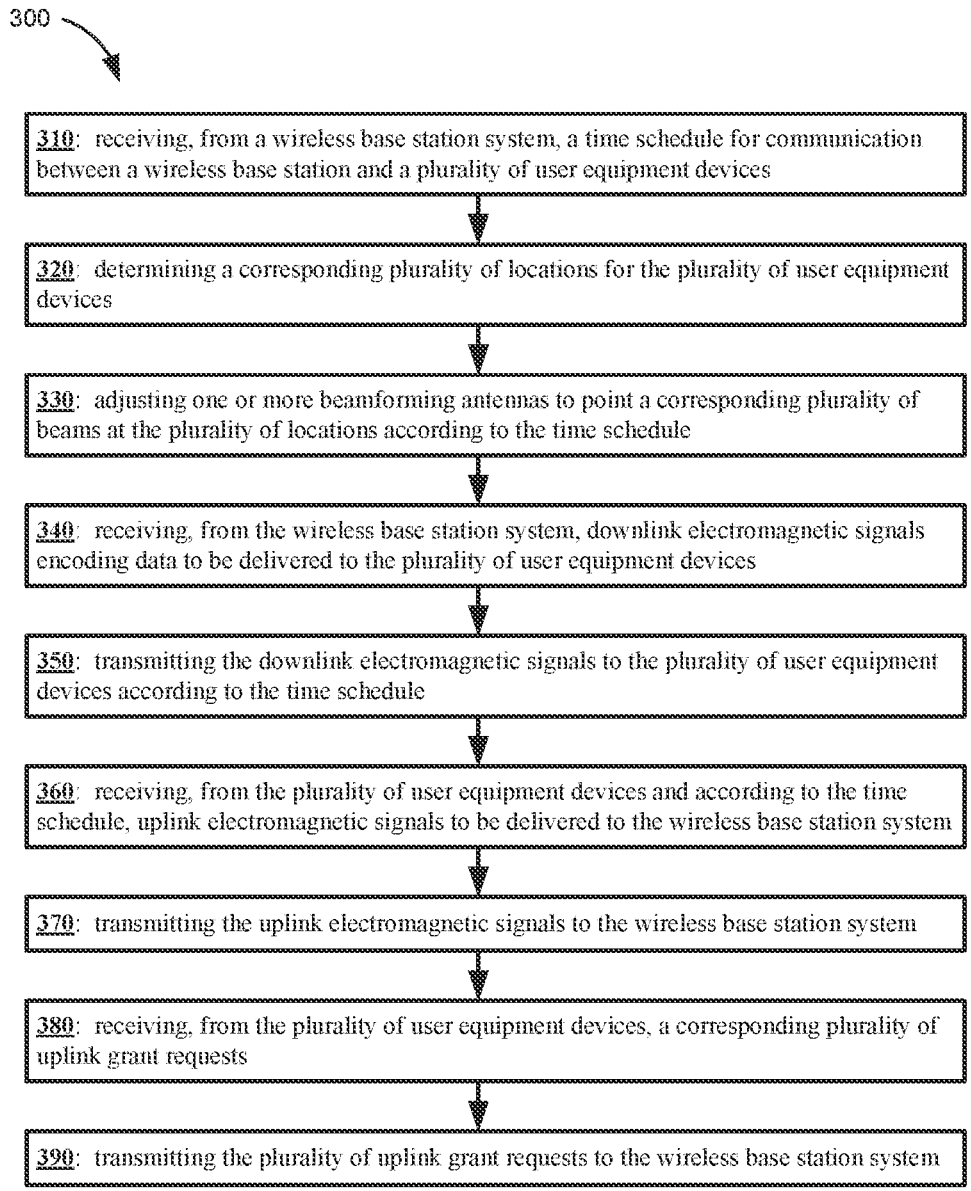
FIGS. 3-6 depict process flows.

With reference now to FIG. 3, an illustrative embodiment is depicted as a process flow diagram. Process 300 includes operation 310—receiving, from a wireless base station system, a time schedule for communication between a wireless base station and a plurality of user equipment devices. For example, repeater 130 in FIG. 1 can receive schedule information via interface 134 with schedule 112 of DU 111.

Process 300 further includes operation 320—determining a corresponding plurality of locations for the plurality of user equipment devices. For example, repeater 130 in FIG. 1 can determine locations of UEs 141E, 142E, and 143E. In some approaches, the locations can be determined by adjusting one or more beamforming antennas of the repeater 130 to illuminate a field of view of the wireless repeater with a succession of beams that collectively span the field of view, and then receiving, from each of the user equipment devices within the field of view, a response indicating which beam in the succession of beams corresponds to the location of that user equipment device.

Process 300 further includes operation 330—adjusting one or more beamforming antennas to point a corresponding plurality of beams at the plurality of locations according to the time schedule. For example, in FIG. 1, controller unit 133 can control the service antenna unit 132 to cast a succession of beams 141, 142, 143 according to the time schedule.

Process 300 further includes operation 340—receiving, from the wireless base station system, downlink electromagnetic signals encoding data to be delivered to the plurality of user equipment devices; and operation 350—transmitting the downlink electromagnetic signals to the plurality of user equipment devices according to the time schedule. For example, repeater 130 in FIG. 1 can receive downlink electromagnetic signals with the donor antenna unit 131 via beam 121 from RU 113 and retransmit the received downlink electromagnetic signals with the service antenna unit 132 via beams 141, 142, and 143 to user equipment 141E, 142E, and 143E, respectively.

Process 300 further includes operation 360—receiving, from the plurality of user equipment devices and according to the time schedule, uplink electromagnetic signals to be delivered to the wireless base station system; and operation 370—transmitting the uplink electromagnetic signals to the wireless base station system. For example, repeater 130 in FIG. 1 can receive uplink electromagnetic signals from user equipment 141E, 142E, and 143E with the service antenna unit 132 via beams 141, 142, and 143, respectively, and retransmit these uplink signals with the donor antenna unit 131 to the RU 113 via beam 121.

Process 300 further includes operation 380—receiving, from the plurality of user equipment devices, a corresponding plurality of uplink grant requests; and operation 390—transmitting the plurality of uplink grant requests to the wireless base station system. For example, repeater 131 in FIG. 1 can receive uplink grant requests from user equipment 141E, 142E and 143E via interfaces 141U, 142U, and 143U, respectively.

Figure 4:
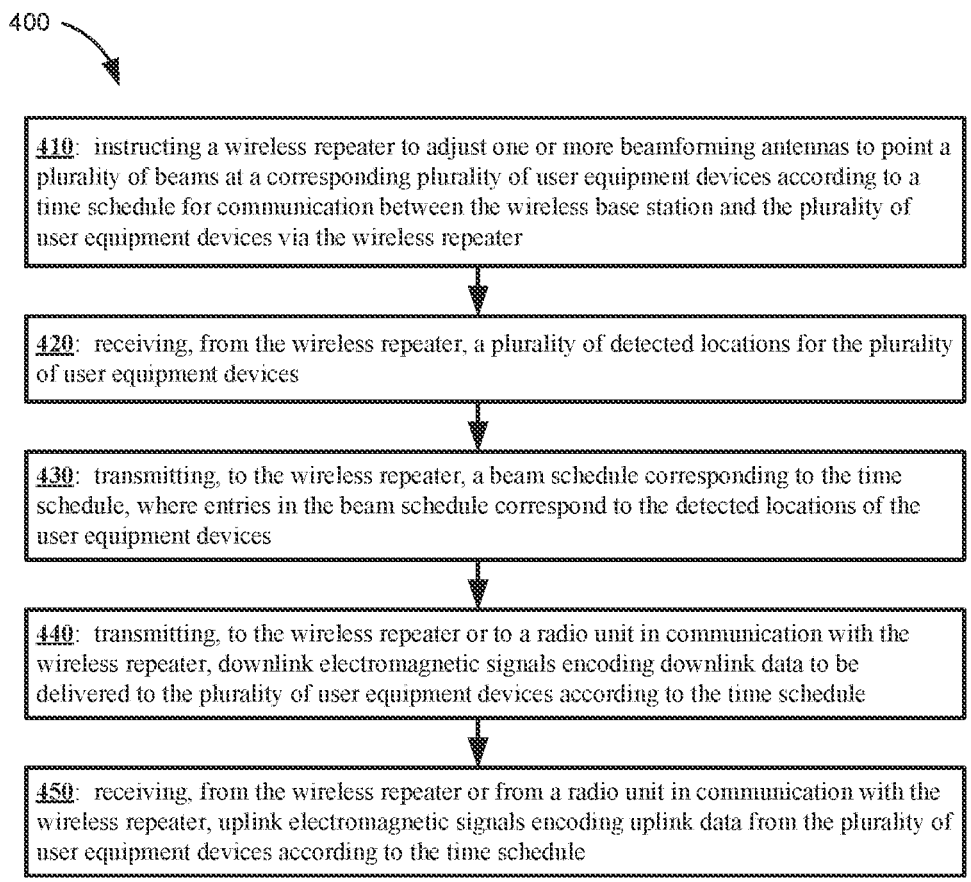

With reference now to FIG. 4, another illustrative embodiment is depicted as a process flow diagram. Process 400 includes operation 410—instructing a wireless repeater to adjust one or more beamforming antennas to point a plurality of beams at a corresponding plurality of user equipment devices according to a time schedule for communication between the wireless base station and the plurality of user equipment devices via the wireless repeater. For example, base station 110 in FIG. 1 can communicate schedule information to repeater 130 via interface 134.

Process 400 further includes operation 420—receiving, from the wireless repeater, a plurality of detected locations for the plurality of user equipment devices; and operation 430—transmitting, to the wireless repeater, a beam schedule corresponding to the time schedule, where entries in the beam schedule correspond to the detected locations of the user equipment devices. For example, if the repeater 130 of FIG. 1 detects the locations of user equipment 141E, 142E, and 143E (e.g., via operation 320 above), the repeater can communicate information about those detected locations to the base station 110 via interface 134, and the base station can subsequently communicate a beam schedule to the repeater for casting beams 141, 142, and 143 to the detected user equipment 141E, 142E, and 143E, respectively.

Process 400 further includes operation 440—transmitting, to the wireless repeater or to a radio unit in communication with the wireless repeater, downlink electromagnetic signals encoding downlink data to be delivered to the plurality of user equipment devices according to the time schedule. For example, base station 110 in FIG. 1 can transmit downlink electromagnetic signals to repeater 130 via beam 121.

Process 400 further includes operation 450—receiving, from the wireless repeater or from a radio unit in communication with the wireless repeater, uplink electromagnetic signals encoding uplink data from the plurality of user equipment devices according to the time schedule. For example, base station 110 in FIG. 1 can receive downlink electromagnetic signals from repeater 130 via beam 121.

Figure 5:
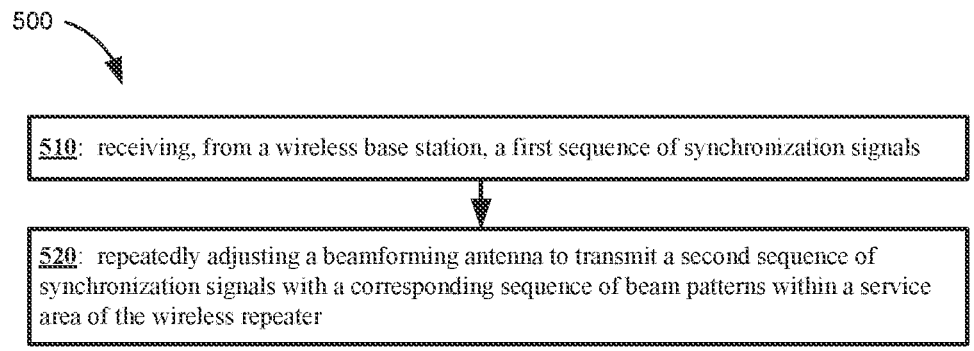

With reference now to FIG. 5, another illustrative embodiment is depicted as a process flow diagram. Process 500 includes operation 510—receiving, from a wireless base station, a first sequence of synchronization signals. For example, in FIGS. 2A-2B, repeater 230 can receive synchronization signals from base station 210 via beam 216, where the synchronization signals correspond to SS Blocks 21-25.

Process 500 further includes operation 520—repeatedly adjusting a beamforming antenna to transmit a second sequence of synchronization signals with a corresponding sequence of beam patterns within a service area of the wireless repeater. For example, in FIGS. 2A-2B, repeater 230 can transmit synchronization signals for SS Blocks 21-25 using a sequence of beam patterns 231-235.

Figure 6:
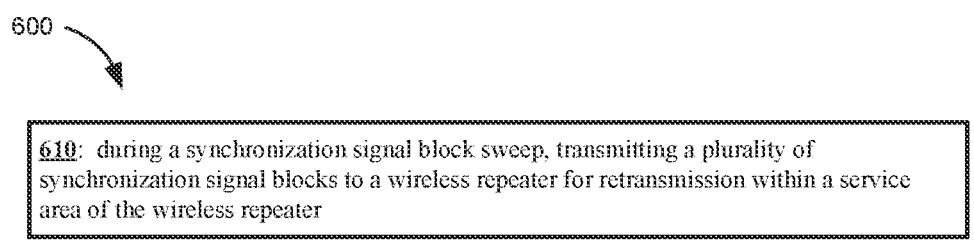

With reference now to FIG. 6, another illustrative embodiment is depicted as a process flow diagram. Process 600 includes operation 610—during a synchronization signal block sweep, transmitting a plurality of synchronization signal blocks to a wireless repeater for retransmission within a service area of the wireless repeater. For example, in FIGS. 2A-2B, base station 210 can transmit synchronization signals for SS Blocks 21-25 to repeater 230 via beam 216.

Additionally, in one or more embodiments, a wireless repeater may include one or more beamforming antennas, one or more processors coupled to one or more memories having instructions stored thereon to cause the wireless repeater to carry out any of the methods disclosed throughout the specification herein. Further, in one or more embodiments, a computer-readable medium may store instructions to cause the wireless repeater to carry out any of the methods disclosed throughout the specification herein.

Also, in one or more embodiments, a method of operating a wireless base station system may be configured to provide for instructing a wireless repeater to adjust one or more beamforming antennas to point a plurality of beams at a corresponding plurality of user equipment devices according to a time schedule for communication between the wireless base station and the plurality of user equipment devices via the wireless repeater. Further, in one or more embodiments, the one or more beamforming antennas may include one or more holographic beamforming antennas. Additionally, in one or more embodiments, the instructing includes transmitting the time schedule to the wireless repeater. Also, in one or more embodiments, the method of operating the wireless base station may include: receiving, from the wireless repeater, a plurality of detected locations for the plurality of user equipment devices; and transmitting, to the wireless repeater, a beam schedule corresponding to the time schedule, where entries in the beam schedule correspond to the detected locations of the user equipment devices. Additionally, in yet one or more other embodiments, the method of operating the wireless base station may include transmitting, to the wireless repeater, downlink electromagnetic signals encoding data to be delivered to the plurality of user equipment devices according to the time schedule. Also, in yet one or more other embodiments, the method of operating the wireless base station may include: transmitting, to a radio unit in communication with the wireless repeater, downlink electromagnetic signals encoding data to be delivered to the plurality of user equipment devices according to the time schedule. Further, in yet one or more other embodiments, the method of operating the wireless repeater may include receiving, from the wireless repeater, uplink electromagnetic signals encoding uplink data from the plurality of user equipment devices according to the time schedule. Moreover, in yet one or more other embodiments, the method of operating the wireless repeater system may include receiving, from a radio unit in communication with the wireless repeater, uplink electromagnetic signals encoding uplink data from the plurality of user equipment devices according to the time schedule.

Furthermore, in one or more embodiments, a method of operating a wireless repeater may include: receiving, from a wireless base station, a first sequence of synchronization signals; and repeatedly adjusting a beamforming antenna to transmit a second sequence of synchronization signals with a corresponding sequence of beam patterns within a service area of the wireless repeater. Also, in one or more embodiments, the second sequence is equal to the first sequence. Additionally, in one or more embodiments, the method of operating the wireless repeater may include: demodulating the first sequence of synchronization signals; and remodulating the demodulated first sequence of synchronization signals to provide the second sequence of synchronization signals. Moreover, in one or more embodiments, the method of operating the wireless repeater may include receiving, from the wireless base station via an out-of-band channel, a schedule for the first sequence of synchronization signals. Further, in one or more embodiments, the wireless base station is a Next Generation NodeB (gNB) for 5G wireless communications. Also, in one or more embodiments, the beamforming antenna is a holographic beamforming antenna. Additionally, in one or more embodiments, the sequence of beam patterns is a raster sequence of narrow beam patterns that collectively fill the service area. Further, in one or more embodiments, the sequence of beam patterns is a pseudorandom or compressive imaging sequence of beam patterns that collectively fill the service area. Moreover, in one or more embodiments, the narrow beam patterns are vertical fan beam patterns having a narrow horizontal beam width and a wide vertical beam width. Also, in one or more embodiments, the narrow beam patterns are horizontal fan beam patterns having a wide horizontal beam width and a narrow vertical beam width. Additionally, in one or more embodiments, the service area of the wireless repeater includes an area outside of a service area of the wireless base station. Further, in one or more embodiments, the service area of the wireless base station is a service area limited by line of sight, foliage loss, distance, or fade. Moreover, in one or more embodiments, the sequence of beam patterns collectively fills the area outside of the service area of the wireless base station.

Furthermore, in one or more embodiments, a method of operating a wireless base station may include, during a synchronization signal block sweep, transmitting a plurality of synchronization signal blocks to a wireless repeater for retransmission within a service area of the wireless repeater. Also, in one or more embodiments, the method of operating the wireless base station may include: the synchronization signal block sweep includes a sweep through a plurality of beam patterns; identifying a beam pattern from the plurality of beam patterns that addresses the wireless repeater; and transmitting of the plurality of synchronization signal blocks to the wireless repeater for retransmission is a transmitting with the identified beam pattern. Additionally, in one or more embodiments, the service area of the wireless repeater includes an area outside of a service area of the wireless base station. Further, in one or more embodiments, the service area of the wireless base station is a service area limited by line of sight, foliage loss, distance, or fade. Moreover, in one or more embodiments, the wireless base station is a Next Generation NodeB (gNB) base station for 5G wireless communications.

In one or more embodiments (not shown in the figures), a computing device may include one or more embedded logic hardware devices instead of one or more CPUs, such as, an Application Specific Integrated Circuits (ASICs), Field Programmable Gate Arrays (FPGAs), Programmable Array Logics (PALs), or the like, or combination thereof. The embedded logic hardware devices may directly execute embedded logic to perform actions. Also, in one or more embodiments (not shown in the figures), the computer device may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins and/or wireless transceivers) to perform actions, such as System On a Chip (SOC), or the like. Additionally, in one or more embodiments, the computational resources may be distributed over a cloud computing platform and the like.

What is claimed as new and desired to be protected by Letters Patent of the United States is:

1. A method of operating a wireless repeater, comprising:
   receiving, from a wireless base station system, a time schedule for communication between the wireless base station and a plurality of user equipment devices;
   determining a corresponding plurality of locations for the plurality of user equipment devices:
   adjusting one or more beamforming antennas to point a corresponding plurality of beams at the plurality of locations according to the time schedule; and
   receiving, from the wireless base station, a beam schedule corresponding to the time schedule, where entries in the beam schedule correspond to the locations of the user equipment devices.

2. The method of claim 1 wherein the wireless base station system includes one or more fifth generation (5G) Next Generation NodeB (gNB) base stations.

3. The method of claim 1 wherein the receiving of the time schedule is a receiving via a wired connection between the wireless base station and the wireless repeater.

4. The method of claim 1 wherein the receiving of the time schedule is a receiving via a wireless connection between the wireless base station and the wireless repeater.

5. The method of claim 4, wherein the wireless connection is a wireless connection using a private or unlicensed frequency band.

6. The method of claim 4, wherein the wireless connection is an out-of-band wireless connection.

7. The method of claim 4, wherein the wireless connection is a wireless connection using a 5G ultra-reliable low-latency communications (URLLC) protocol.

8. The method of claim 1 further comprising:
receiving, from the wireless base station system, downlink electromagnetic signals encoding data to be delivered to the plurality of user equipment devices; and
transmitting the downlink electromagnetic signals to the plurality of user equipment devices according to the time schedule.

9. The method of claim 8, wherein the downlink electromagnetic signals are electromagnetic signals in a 5G new radio frequency band.

10. The method of claim 9, wherein the 5G new radio frequency band is a millimeter wave (mmWave) frequency band.

11. The method of claim 8, wherein the receiving of the downlink electromagnetic signals is a receiving via a wired connection between the wireless base station and the wireless repeater.

12. The method of claim wherein:
the wireless base station system includes a scheduling unit and a radio unit;
the receiving of the time scheduling is a receiving from the scheduling unit; and
the receiving of the downlink electromagnetic signals is a receiving from the radio unit.

13. The method of claim 1, further comprising:
receiving, from the plurality of user equipment devices and according to the time schedule,
uplink electromagnetic signals to be delivered to the wireless base station system; and
transmitting the uplink electromagnetic signals to the wireless base station system.

14. The method of claim 13, wherein the transmitting of the uplink electromagnetic signals is a transmitting via a wired connection between the wireless base station and the wireless repeater.

15. The method of claim 1, wherein the adjusting of the one or more beamforming antennas includes:
adjusting the one or more beamforming antennas to point the corresponding plurality of beams at the plurality of locations according to the time schedule and the received beam schedule.

16. The method of claim 1 wherein the one or more beamforming antennas include one or more holographic beamforming antennas.

17. A method of operating a wireless repeater, comprising:
receiving, from a wireless base station system, a time schedule for communication between the wireless base station and a plurality of user equipment devices;
determining a corresponding plurality of locations for the plurality of user equipment devices;
adjusting one or more beamforming antennas to point a corresponding plurality of beams at the plurality of locations according to the time schedule;
receiving, from the plurality of user equipment devices and according to the time schedule, uplink electromagnetic signals to be delivered to the wireless base station system;
transmitting the uplink electromagnetic signals to the wireless base station system;
receiving, from the plurality of user equipment devices, a corresponding plurality of uplink grant requests; and
transmitting the plurality of uplink grant requests to the wireless base station system.

18. The method of claim 17, wherein:
the wireless repeater includes a module for direct side link communication; and
the receiving of the uplink grant requests is a receiving by the module via direct side link communication with the plurality of user equipment devices.

19. The method of claim 17, wherein the receiving of the uplink grant requests is a receiving via a private frequency band.

20. The method of claim 17, wherein the receiving of the uplink grant requests is a receiving via a 5G ultra-reliable low-latency communications (URLLC) protocol.

21. The method of claim 17 wherein the determining of the plurality of locations for the plurality of user equipment devices includes:
detecting the locations of the user equipment devices; and
constructing a beam schedule corresponding to the time schedule, where entries in the beam schedule correspond to the detected locations of the user equipment devices.

22. The method of claim 21, wherein the detecting of the locations of the user equipment devices includes:
adjusting the one or more beamforming antennas to illuminate a field of view of the wireless
repeater with a succession of beams that collectively span the field of view; and
receiving, from each of the user equipment devices, a response indicating which beam in the succession of beams corresponds to the location of that user equipment device.

23. The method of claim 21, wherein the detecting of the locations of the user equipment devices is a detecting with an angle-of-arrival detector.

24. The method of claim 21, wherein the adjusting of the one or more beamforming antennas includes:
adjusting the one or more beamforming antennas to point the corresponding plurality of beams at the plurality of locations according to the time schedule and the constructed beam schedule.

25. A wireless repeater, comprising:
one or more beamforming antennas; and
one or more processors coupled to one or more memories having instructions stored thereon to cause the wireless repeater to carry out one or more methods of operating the wireless repeater comprising:
receiving, from a wireless base station system, a time schedule for communication between the wireless base station and a plurality of user equipment devices;
determining a corresponding plurality of locations for the plurality of user equipment devices:
adjusting one or more beamforming antennas to point a corresponding plurality of beams at the plurality of locations according to the time schedule; and
receiving, from the wireless base station, a beam schedule corresponding to the time schedule, where entries in the beam schedule correspond to the locations of the user equipment devices.

26. A computer-readable non-transitory medium storing instructions to cause a wireless repeater to carry out one or more methods of operating the wireless repeater, comprising:
receiving, from a wireless base station system, a time schedule for communication between the wireless base station and a plurality of user equipment devices;
determining a corresponding plurality of locations for the plurality of user equipment devices;
adjusting one or more beamforming antennas to point a corresponding plurality of beams at the plurality of locations according to the time schedule; and receiving, from the wireless base station, a beam schedule corresponding to the time schedule, where entries in the beam schedule correspond to the locations of the user equipment devices.

* * * * *